United States Patent [19]
Kidd et al.

[11] Patent Number: 5,358,921
[45] Date of Patent: Oct. 25, 1994

[54] SELECTIVE REMOVAL OF HYDROGEN SULFIDE OVER A ZINC OXIDE AND SILICA ABSORBING COMPOSITION

[75] Inventors: Dennis R. Kidd, Dewey; Gary A. Delzer, Bartlesville; Donald H. Kubicek, Bartlesville; Paul F. Schubert, Bartlesville, all of Okla.

[73] Assignee: Phillips Petroleum Company, Bartlesville, Okla.

[21] Appl. No.: 55,586

[22] Filed: May 3, 1993

Related U.S. Application Data

[60] Division of Ser. No. 875,005, Apr. 24, 1992, Pat. No. 5,248,489, which is a continuation of Ser. No. 363,030, Jun. 7, 1989, abandoned.

[51] Int. Cl.$^5$ .......................... B01J 20/10; B01J 20/30
[52] U.S. Cl. .................................... 502/407; 502/237; 502/253
[58] Field of Search ................ 502/237, 253, 250, 407

[56] References Cited

U.S. PATENT DOCUMENTS

| | | | |
|---|---|---|---|
| 3,506,732 | 4/1970 | Crowley et al. | 502/253 |
| 4,677,096 | 6/1987 | van der Smissen | 502/407 |
| 5,102,854 | 4/1992 | Delzer et al. | 502/407 |
| 5,130,288 | 7/1992 | Delzer et al. | 502/237 |

Primary Examiner—Carl F. Dees
Attorney, Agent, or Firm—Charles W. Stewart

[57] ABSTRACT

Hydrogen sulfide is removed from a fluid stream containing hydrogen sulfide by contacting the fluid stream under suitable absorbing conditions with an absorbing composition consisting essentially of zinc oxide and silica. Additionally, the absorbing composition may contain binders and may be promoted, preferably with nickel oxide.

8 Claims, No Drawings

SELECTIVE REMOVAL OF HYDROGEN SULFIDE OVER A ZINC OXIDE AND SILICA ABSORBING COMPOSITION

This is a division of continuation application Ser. No. 875,005, filed Apr. 24, 1992, now U.S. Pat. No. 5,248,489, which is a continuation of application Ser. No. 07/363,030, filed Jun. 7, 1989, now abandoned.

BACKGROUND OF THE INVENTION

This invention relates to an improved process for selectively removing hydrogen sulfide from gaseous streams.

The removal of sulfur from fluid streams can be desirable or necessary for a variety of reasons. If the fluid stream is to be released as a waste stream, removal of sulfur from the fluid stream can be necessary to meet the sulfur emission requirements set by various air pollution control authorities. Such requirements are generally in the range of about 10 ppm to 500 ppm of sulfur in the fluid stream. If the fluid stream is to be burned as a fuel, removal of sulfur from the fluid stream can be necessary to prevent environmental pollution. If the fluid stream is to be processed, removal of the sulfur is often necessary to prevent the poisoning of sulfur sensitive catalysts or to satisfy other process requirements.

A variety of methods employing regenerable, solid contact materials are known for removing sulfur from a fluid stream when the sulfur is present as hydrogen sulfide. For example, U.S. Pat. No. 4,088,736 discloses a composition comprising zinc oxide, alumina, and a Group IIA metal which is an effective absorbing composition for hydrogen sulfide and which possesses the property of being regenerable to the original absorbing composition state in the presence of oxygen when fully sulfided.

Although the absorbing compositions employed in such methods may effectively absorb hydrogen sulfide from a fluid stream containing hydrogen sulfide, it has been found that many of these absorbing compositions effectively oxidize significant amounts of hydrogen sulfide to sulfur dioxide. The resulting sulfur dioxide is not absorbed by the absorbing compositions and, thus, passes unabsorbed through the contact material. In view of the fact that environmental concerns are focused on the total amount of sulfur contained in an effluent stream, and not just the amount of hydrogen sulfide, passing sulfur dioxide through the contact material and out to the environment is not acceptable under current environmental standards.

SUMMARY OF THE INVENTION

It is thus an object of the present invention to provide an improved process for selectively removing hydrogen sulfide from fluid streams containing hydrogen sulfide without producing a treated fluid stream containing significant amounts of sulfur dioxide. It is a further object of this invention to provide an improved absorbing composition which possesses the property of being regenerable to the original absorbing composition state in the presence of oxygen when fully sulfided.

It has been found, in accordance with the present invention, that the addition of silica to zinc oxide provides an absorbing composition that is very effective in the removal of hydrogen sulfide from a fluid stream containing hydrogen sulfide, while significantly reducing, in comparison to various known absorbing compositions, the amount of hydrogen sulfide that is oxidized to sulfur dioxide during the absorption process.

DETAILED DESCRIPTION OF THE INVENTION

Thus, in accordance with the present invention, an absorbing composition consisting essentially of zinc oxide and silica is utilized to selectively remove hydrogen sulfide from a fluid stream containing hydrogen sulfide. Additionally, the absorbing composition may contain one or more promoters, such as nickel oxide, and one or more binders. Once the absorbing composition of the present invention has been prepared, fluid streams containing hydrogen sulfide are contacted with the absorbing composition under suitable absorbing conditions to substantially reduce the concentration of hydrogen sulfide in the fluid stream without significantly increasing the concentration of sulfur dioxide therein.

It is believed that the hydrogen sulfide is being absorbed by the absorbing composition and thus the terms "absorption process" and "absorbing composition" are utilized for the sake of convenience. However, the exact chemical phenomenon occurring is not the inventive feature of the process of the present invention and the use of the term "absorb" in any form is not intended to limit the present invention.

The selective absorption process is preferably carried out in cycles comprising an absorption period and a period for the regeneration of the sulfided absorbing composition. The absorption period comprises contacting a gaseous stream which contains hydrogen sulfide with the absorbing composition to thereby selectively remove hydrogen sulfide from the gaseous stream. The absorbing composition becomes sulfided during the absorption period. When the absorbing composition becomes sulfided to the point that regeneration is desirable, preferably when it is nearly completely sulfided, an oxygen-containing gas is passed in contact with the absorbing composition to regenerate the absorbing composition and to convert the absorbed sulfur to a sulfur oxide.

The chemical changes that are believed to occur in the absorbing composition during this cyclic process are summarized in the following equations:

$$ZnO + H_2S \rightarrow ZnS + H_2O \tag{I}$$

$$ZnS + Oxygen \rightarrow ZnO + SO_x \tag{II}$$

Other objects and advantages of the invention will be apparent from the foregoing description of the invention and the appended claims as well as from the detailed description of the invention which follows.

The absorbing composition of the present invention may be utilized to remove hydrogen sulfide from any suitable gaseous stream. The hydrogen sulfide may be produced by the hydrodesulfurization of organic sulfur compounds or may be originally present in the gaseous stream as hydrogen sulfide. Examples of such suitable gaseous streams include light hydrocarbons such as methane, ethane and natural gas; gases derived from petroleum products and products from extraction and/or liquefaction of coal and lignite; gases derived from tar sands and shale oil; coal derived synthesis gas; gases such as hydrogen and nitrogen; gaseous oxides of carbon; steam and the inert gases such as helium and argon. Gases that adversely affect the removal of hydrogen sulfide and which should be absent from the gaseous streams being processed are oxidizing agents, examples of which include air, molecular oxygen, the halogens, and the oxides of nitrogen.

The absorbing composition of the present invention may be utilized to remove hydrogen sulfide from olefins such as ethylene. This process, however, should be carried out in the absence of free hydrogen to avoid hydrogenation. Olefin streams should not be hydrodesulfurized as this may result in undesirable hydrogenation of at least a portion of the olefins to paraffins.

In one embodiment of the present invention, the absorbing composition consists essentially of zinc oxide and silica. In a second embodiment of the present invention, the absorbing composition consists essentially of zinc oxide, silica, and nickel oxide. In a third, and preferred, embodiment of the present invention, the absorbing composition comprises zinc oxide and diatomite, preferably promoted with nickel oxide. Additionally, each of these absorbing compositions can further contain binders.

The absorbing composition employed in the process of the present invention may be prepared by any suitable method known in the art. Examples of such suitable methods include coprecipitation, dry mixing of solids, and slurrying. Once the absorbing composition has been prepared, it may be formed into a suitable contact material by any suitable method known in the art. Examples of such suitable methods include extrusion, pelletization, tabletting, and spray drying.

A preferred method for preparing the absorbing composition employed in the process of the present invention is to combine silica, zinc oxide, and, if present, a binder in a mixer. After mixing these components to form a mixture thereof, a dilute acid is then added with continued mixing to the resulting mixture to thereby form an extrudable paste. The extrudable paste is then extruded, dried, and calcined to form the absorbing composition. Due to the abrasive nature of silica, and its destructive effect on extrusion equipment, it may be desirable to include a lubricant, such as graphite, as a component in the original mixture. The lubricant is then removed from the resulting composition during the calcination step, either by combustion or by conversion of the lubricant to a metal oxide promoter in accordance with the present invention.

In view of the equipment wear caused by extruding the abrasive silica, an alternative method for forming the absorbing composition may be desired. One example of such a method is to pelletize a mixture of silica, zinc oxide, and, if present, a binder in the presence of a dilute acid by employing a disk or drum pelletizer. The mixture of silica, zinc oxide, and, if present, a binder may be prepared in the manner described above, or may be prepared in other suitable apparatus, such as a double cone blender.

In a preferred embodiment of the present invention, nickel oxide or its precursor is added to the extruded, dried, and calcined composition, and the now-promoted composition is dried and calcined a second time to form the promoted absorbing composition. Alternatively, the nickel oxide or its precursor may be included as a component of the original mixture, thus reducing the number of times the composition must be dried and calcined to form the promoted absorbing composition.

The zinc oxide used in the preparation of the absorbing composition may be either in the form of zinc oxide, or in the form of one or more zinc compounds that are convertible to zinc oxide under the conditions of preparation described herein. Examples of such zinc compounds include zinc sulfide, zinc sulfate, zinc hydroxide, zinc carbonate, zinc acetate, and zinc nitrate. Preferably, the zinc oxide is in the form of powdered zinc oxide.

The silica used in the preparation of the absorbing composition may be either in the form of silica, or in the form of one or more silicon compounds that are convertible to silica under the conditions of preparation described herein. Any suitable type of silica may be used in the absorbing composition employed in the process of the present invention. Examples of suitable types of silica include diatomite, silicalite, silica colloid, flame-hydrolyzed silica, hydrolyzed silica, and precipitated silica, with diatomite being presently preferred. Examples of silicon compounds that are convertible to silica under the conditions of preparation described herein include silicic acid, sodium silicate, and ammonium silicate. Preferably, the silica is in the form of diatomite.

In accordance with the preferred method previously described herein, silica, zinc oxide, and, if present, a binder are initially combined in a mixer. To achieve the desired dispersion of these materials, the materials are blended until a homogenous mixture is formed. The mixing time will generally be in the range of about 1.0 minute to about 45 minutes, and will preferably in the range of about 2.0 minutes to about 15 minutes.

Any suitable binder may be added to the absorbing composition employed in the process of the present invention. A suitable binder is considered to be any material that improves the physical strength of the final absorbing composition without having a significant adverse effect on the performance of the absorbing composition in the process of the present invention, such as a significant increase in the amount of hydrogen sulfide being oxidized to sulfur dioxide by the absorbing composition. Examples of suitable binders include alumina and calcium aluminate. The binders may be added in any form suitable for combination with the silica and zinc oxide. For example, the binder may be in the form of a solid material, a dry powder, or a sol.

When the silica, zinc oxide, and, when present, binder have been blended within the mixer for the desired amount of time, a dilute acid is then added, with continued mixing, to the resulting mixture to thereby form an extrudable paste. The dilute acid may be added to the resulting mixture by any suitable method. Preferably, the dilute acid is added to the resulting mixture by spraying it within the mixer during continued mixing.

Any suitable acid may be used in the preparation of the absorbing composition. Examples of suitable acids include nitric acid, acetic acid, sulfuric acid, and hydrochloric acid, with acetic acid being presently preferred. The acid concentration in the dilute acid employed in the preparation of the absorbing composition will generally be in the range of about 1.0 weight-% to about 15 weight-%, and will preferably be in the range of about 1.0 weight-% to about 5.0 weight-%, said weight-% being expressed in terms of the concentrated acid based upon the total weight of the dilute acid.

As part of this invention, it has been discovered that the amount of water that is added to the resulting mixture, in the form of the dilute acid, to form the extrudable paste has an effect on the particle crush strength of the resulting absorbing composition. Thus, to prepare absorbing compositions having higher particle crush strengths, the amount of water added to the resulting mixture will generally be in the range of about 0.26 lbs water/lbs solids to about 0.38 lbs water/lbs solids, and will preferably be less than about 0.30 lbs water/lbs solids.

After adding the dilute acid to the resulting mixture, the acidized mixture will generally continue to be mixed for a period of time in the range of about 5 minutes to about 60 minutes, preferably in the range of about 10 minutes to about 30 minutes, thereby forming the extrudable paste.

The extrudable paste may either be directly extruded or may be aged prior to being extruded. As part of the present invention it has been discovered that whether or not the extrudable paste is aged has an effect on the physical properties of the resulting absorbing composition and, further, that this effect varies with the type and concentration of dilute acid used and the liquids to solids ratio used in the preparation of the extrudable paste. Thus, for example, when employing acetic acid in the preparation of the absorbing composition, a higher crush strength material may be obtained by extruding the extrudable paste as soon as practically possible, without significant aging. When low concentration nitric acid is employed at a low liquids to solids ratio, however, a higher crush strength material may be obtained by allowing the extrudable paste to age for a period of time prior to extruding it. The desirability of aging the extrudable paste, with respect to any suitable acid and liquids to solids ratio, may be determined by routine experimentation. Thus, in accordance with the present invention, the extrudable paste may be aged for any suitable amount of time. The extrudable paste will generally be aged for a period of time in the range of about 0 minutes to about 120 minutes, and will preferably be aged for a period of time in the range of about 0 minutes to about 60 minutes.

The extrudable paste is then extruded by methods well known in the art. The extruded material is then dried at a temperature generally in the range of about 75° C. to about 300° C., and more preferably in the range of about 90° C. to about 250° C., for a period of time generally in the range of about 0.5 hour to about 4 hours, and more preferably in the range of about 1 hour to about 3 hours. The dried, extruded material is then calcined in the presence of oxygen at a temperature generally in the range of about 375° C. to about 750° C., and more preferably in the range of about 500° C. to about 700° C., for a period of time generally in the range of about 0.5 hour to about 4 hours, and more preferably in the range of about 1 hour to about 3 hours to produce the absorbing composition employed in the process of the present invention.

The zinc oxide will generally be present in the absorbing composition in an amount in the range of about 10 weight-% to about 90 weight-%, and will more preferably be in the range of about 45 weight-% to about 90 weight-%, and will most preferably be in the range of about 45 weight-% to about 60 weight-%, when said weight-%'s are expressed in terms of the zinc oxide based upon the total weight of the absorbing composition.

The silica will generally be present in the absorbing composition in an amount in the range of about 10 weight-% to about 90 weight-%, and will more preferably be in the range of about 30 weight-% to about 60 weight-%, when said weight-%'s are expressed in terms of the silica based upon the total weight of the absorbing composition.

The binder, when present, will generally be present in the absorbing composition in an amount in the range of about 5.0 weight-% to about 30 weight-%, and will more preferably be in the range of about 5.0 weight-% to about 15 weight-%, when said weight-%'s are expressed in terms of the weight of the binder compared with the total weight of the absorbing composition.

The absorbing composition employed in the process of the present invention may be promoted with suitable metal oxides. Examples of suitable metal oxides include the oxides of molybdenum, tungsten, one or more metals selected from Group VIII of the Periodic Table, and any other metal that is known to have hydrogenation ability of the type necessary to reduce sulfur oxide species to hydrogen sulfide. In a preferred embodiment of the present invention, the absorbing composition is promoted with nickel oxide.

The metal oxide promoter may be added to the absorbing composition in the form of the elemental metal, metal oxide, and/or metal-containing compounds that are convertible to metal oxides under the calcining conditions described herein. Some examples of such metal-containing compounds include metal acetates, metal carbonates, metal nitrates, metal sulfates, metal thiocyanates, and mixtures of two or more thereof.

The elemental metal, metal oxide, and/or metal-containing compounds can be added to the absorbing composition by any method known in the art. One such method is the impregnation of the absorbing composition with a solution, either aqueous or organic, that contains the elemental metal, metal oxide, and/or metal-containing compounds. After the elemental metal, metal oxide, and/or metal-containing compounds have been added to the absorbing composition, the promoted composition is dried and calcined, as described hereinafter.

As previously noted herein, the elemental metal, metal oxide, and/or metal-containing compounds can be added to the absorbing composition as components of the original mixture, or they may be added after the absorbing composition has initially been dried and calcined. If the metal oxide promoter is added to the absorbing composition after it has initially been dried and calcined, then the now-promoted composition is dried and calcined a second time to form the promoted absorbing composition. The now-promoted composition is generally dried at a temperature in the range of about 75° C. to about 300° C., more preferably in the range of about 90° C. to about 250° C., for a period of time generally in the range of about 0.5 hour to about 8 hours, more preferably in the range of about 3 hours to about 5 hours. The dried, promoted composition is then calcined in the presence of oxygen generally at a temperature in the range of about 375° C. to about 750° C., and more preferably in the range of about 500° C. to about 700° C., until volatile matter is removed and the elemental nickel and/or the nickel-containing compounds are substantially converted to nickel oxides. The time required for this calcining step will generally be in the range of about 0.5 hour to about 4 hours, and will preferably be in the range of about 1 hour to about 3 hours.

The metal oxide promoter will generally be present in the absorbing composition in an amount ranging from about 0.1 weight-% to about 15 weight-%, and will more preferably be in the range of about 2.0 weight-% to about 7.5 weight-%, most preferably about 6.0 weight-%, said weight-%'s being expressed in terms of the metal oxide based upon the total weight of the absorbing composition.

The processes of the present invention can be carried out by means of any apparatus whereby there is achieved an alternate contact of the absorbing composition with the gaseous feed stream and, thereafter, of the absorbing composition with an oxygen-containing gas which is utilized to regenerate the absorbing composition. The process is in no way limited to the use of a particular apparatus. The process of this invention can be carried out using a fixed bed of absorbing composition, a fluidized bed of absorbing composition, or a moving bed of absorbing composition. Presently preferred is a fixed bed of absorbing composition.

In order to avoid any casual mixing of the gaseous feed stream containing hydrogen sulfide with the oxygen-containing gas utilized in the regeneration step, provision is preferably made for terminating the flow of the gaseous feed stream to the reactor and subsequently injecting an inert purging fluid such as nitrogen, carbon dioxide or steam. Any suitable purge time can be utilized but the purge should be continued until all hydrocarbon and/or hydrogen sulfide are removed. Any suitable flow rate of the purge fluid may be utilized. Presently preferred is a purge fluid flow rate in the range of about 800 GHSV to about 1200 GHSV.

Any suitable temperature for the processes of the present invention may be utilized. The temperature will generally be in the range of about 150° C. to about 600° C. and will more preferably be in the range of about 200° C. to about 450° C.

Any suitable temperature may be utilized to regenerate the absorbing composition from its sulfided form back to the original absorbing composition form. The temperature will generally be in the range of about 370° C. to about 815° C. As a result of parallel work, however, it has been discovered that the higher temperatures required to initiate the regeneration of ZnS to ZnO (i.e. about 650° C. and higher) has an adverse effect on the amount of sulfur dioxide that is produced during the subsequent absorption cycle. Due to the fact that the regeneration of NiS to NiO is an exothermic reaction, and the fact that this reaction is initiated at a lower temperature (i e about 425° C.) the presence of nickel oxide in the absorbing composition employed in the process of the present invention allows the regeneration to occur at a lower temperature, thereby preventing the adverse effect described above. Thus, the regeneration temperature is preferably in the range of about 425° C. to about 600° C., most preferably about 425° C., to effect the regeneration within a reasonable time while not adversely affecting the production of sulfur dioxide in the treated gaseous feed stream.

Any suitable pressure can be utilized for the processes of the present invention. The pressure of the gaseous feed stream being treated is not believed to have an important effect on the absorption process of the present invention, and will generally be in the range of from about atmospheric to about 2,000 psig during the treatment.

Any suitable residence time for the gaseous feed stream in the presence of the absorbing composition of the present invention can be utilized. The residence time expressed as volumes of gas at standard temperature and pressure per volume of absorbing composition per hour will generally be in the range of about 10 to about 10,000 and will more preferably be in the range of about 250 to about 2500.

When the absorbing composition is completely sulfided it will no longer combine with the hydrogen sulfide in the manner set forth in equation (I). When this condition occurs, hydrogen sulfide will begin to appear in the effluent flowing from the reaction and this will be an indication that the absorbing composition should preferably be regenerated. The time required for the absorbing composition to become completely sulfided will generally be a function of the concentration of sulfur in the feedstock and feed rate employed.

When the absorbing composition becomes substantially completely sulfided, the absorbing composition is typically regenerated by terminating the flow of feed to the reactor and purging with an inert fluid such as nitrogen to remove any combustibles. A free oxygen-containing gas is then introduced to the reactor for the purpose of oxidizing the zinc sulfide in accordance with equation (II).

The amount of oxygen supplied to the reactor during the regeneration step will generally be sufficient to at least substantially remove sulfur from the absorbing composition. The regeneration step is generally conducted at about atmospheric pressure. The temperature for the regeneration step is generally maintained in the range of about 370° C. to about 815° C., and is more preferably maintained at about 425° C. in order to oxidize the zinc sulfide within a reasonable time.

The following examples are presented in further illustration of the invention.

EXAMPLE I

In this example the experimental procedure for the removal of hydrogen sulfide from gas streams containing hydrogen sulfide by means of various solid sorbent materials is described.

The tests were carried out in a single reactor unit comprising a 20 mm O.D. Quartz reactor and a 2 mm thermocouple well. The reactor, which was maintained at a pressure of about 1.7 psig, was operated in a fixed bed down flow mode using 10 grams of sorbent. Within the reactor, the sorbent was heated to the reaction temperature in a stream of nitrogen. When the desired temperature was attained, the nitrogen flow was stopped, and the simulated sulfur plant gas and water vapor flows (the water content was about 12% of the gaseous stream) were started. The water vapor was generated by pumping water through a heated line within the reactor. The reaction was carried out at a reaction temperature of about 425° C. and a gas hourly space velocity of 2500 cc/cc catalyst/hour. The composition of the simulated sulfur plant gas was as follows: 4.35 volume-% hydrogen sulfide, 39.9 volume-% carbon dioxide, and 55.75 volume-% nitrogen.

The progress of the absorption was followed by measuring the concentration of hydrogen sulfide and/or the sulfur dioxide in the reactor effluent after the water vapor had been condensed and removed from the effluent. The concentration of hydrogen sulfide and/or sulfur dioxide was measured with Draeger tubes that were suited to the concentration ranges encountered.

Once the sorbents became fully sulfided, as evidenced by hydrogen-sulfide breakthrough, the flow of the simulated sulfur plant gas to the reactor was halted and the reactor was purged with nitrogen for a period of about 20 minutes while being heated to a regeneration temperature in the range of about 621° C. to about 676° C. The sulfided sorbent was then regenerated in the presence of air for about 1.5 hours. Following regeneration, the reactor was again purged with nitrogen for about 40 minutes while being cooled back down to the reaction temperature of about 425° C. The nitrogen purge was then halted and the simulated sulfur plant gas was fed to tile reactor to begin another absorption cycle.

EXAMPLE II

This example describes the sorbent materials which were tested in accordance with the procedures set forth in Example I.

Sorbent A: comprised $Ni/ZnO/Al_2O_3$ with 7.0 weight-% Ni (as NiO), 46.5 weight-% ZnO and 46.5 weight-% $Al_2O_2$. Sorbent A was prepared in the following manner: First, ZnO powder (Lot 052579; Alfa Products Division, Morton Thiokol, Inc.; Danvers, Mass.) was ground to a particle size of −200 mesh. Next, about 61.2 grams of α-alumina monohydrate were dispersed in 500 mL of water with stirring. 4.4 mL of concentrated nitric acid were then added to the solution to form an acidic solution comprising alumina. Next, a ZnO hydrosol was prepared by slurrying 50.5 grams of the ground ZnO powder in 150 ml of water. After stirring the acidic solution comprising alumina for about 10 minutes, the ZnO hydrosol was added, with rapid stirring, to the acidic solution comprising alumina, and a hydrogel of zinc oxide and alumina was quickly formed. The hydrogel of zinc oxide and alumina was then transferred to an evaporating dish and dried at a temperature of about 120° C. for about 12 hours. The dried hydrogel was then calcined in air at 500° C. for a period of 3 hours. The BET/$N_2$ surface area of the calcined hydrogel was about 60 m²/g. 50 grams of the calcined hydrogel were then impregnated with a solution containing 17.3 grams of $Ni(NO_3)_2$. $6H_2O$ (Lot 022381; Alfa Products Division, Morton Thiokol, Inc.; Danvers, Mass.) and 33 grams of $H_2O$. Not all of the solution could be added to the calcined hydrogel, so the partially-impregnated hydrogel was partially dried under a heat lamp before continuing with the impregnation of the rest of the solution. The impregnated hydrogel was then dried for 3 hours at about 110° C., and then calcined at 500° C. for an additional 3 hours to form Sorbent A.

Sorbent B: comprised $Ni/ZnO/SiO_2$ with 6.0 weight-% Ni (as NiO), 47 weight-% ZnO and 47 weight-% $SiO_2$. Sorbent B was prepared in the following manner: 50 grams of ZnO (St. Joe Minerals Corporation (now Horsehead Industries); Palmerton, Pa.) were combined with 50 grams of $SiO_2$ (Cab-o-sil silica; Cabot Corporation; Tuscola, Ill.). The combined ZnO and $SiO_2$ were dry mixed for about 3 minutes prior to being mulled in a solution containing 118.4 grams of $H_2$ and 1.48 grams of $HNO_3$, although only 66.30 grams of the solution were used to reach a desired consistency. The ,resulting extrudate was dried overnight in air and then dried at 110° C. for about 3 hours. The dried extrudate was then calcined at about 500° C. for about 3 hours. About 25 grams of the calcined extrudate was then impregnated with a solution containing 7.43 grams of $Ni(NO_3)_2$. $6H_2O$ (Lot 022381; Alfa Products Division, Morton Thiokol, Inc.; Danvers, Mass.) and 18.25 grams of $H_2$. After impregnation, the impregnated extrudate was dried under a heat lamp for about 1 hour, then dried at about 110° C. for about 3 hours, and finally calcined at 500° C. for 3 hours to form Sorbent B.

Sorbent C: comprised $Ni/ZnO/SiO_2$ with 6.0 weight-% Ni (as NiO), 47 weight-% ZnO and 47 weight-% $SiO_2$. Sorbent C was prepared in the following manner: 50 grams of ZnO (St. Joe Minerals Corporation (now Horsehead Industries); Palmerton, PA) were combined with 50 grams of $SiO_2$ (Diatomaceous earth; Fisher Scientific Company; Pittsburgh, Pass.). The combined ZnO and $SiO_2$ were dry mixed for about 3 minutes prior to being mulled in a solution comprising 118.44 grams of $H_2O$ and 1.48 grams of $HNO_3$, although only 54.41 grams of the solution were used to reach a desired consistency. The resulting extrudate was dried overnight in air and then dried at 110° C for about 3 hours. The dried extrudate was then calcined at about 500° C. for about 3 hours. About 25 grams of the calcined extrudate was then impregnated with a solution containing 7.43 grams of $Ni(NO_3)_2$. $6H_2O$ (Lot 022381; Alfa Products Division, Morton Thiokol, Inc.; Danvers, Mass.) and 9.32 grams of $H_2O$. After impregnation, the impregnated extrudate was dried under a heat lamp for about 1 hour, then dried at about 110° C. for about 3 hours, and finally calcined at 500° C. for 3 hours to form Sorbent C.

EXAMPLE III

This example illustrates the use of the sorbents described in Example II within the procedure described in Example I for the removal of $H_2S$ from a simulated sulfur plant gas. The results are presented as a function of the amount of sulfur dioxide (measured in ppm) present in the effluent gaseous stream at a point in time 10 minutes into the absorption cycle, and of the total amount of sulfur absorbed by the sorbent (measured on a weight basis) at the time of hydrogen sulfide breakthrough. The cycle number listed is the number of the absorption cycle in which the reading was taken during an ongoing test comprising repeated cycles of absorption and regeneration. The test results are summarized in Table I.

TABLE I

| Run | Sorbent | Composition | Cycle # | SO2 Level | Sulfur Loading |
|---|---|---|---|---|---|
| 1 (Control) | A | Ni/ZnO/Al2O3 | 6 | 1800 | 9.5 |
|  |  |  | 7 | 1680 | 8.5 |
| 2 (Invention) | B | Ni/ZnO/SiO2 (Cab-O-Sil) | 1 | 0 | 10.0 |
|  |  |  | 5 | 600 | 9.9 |
|  |  |  | 6 | 600 | 9.9 |
|  |  |  | 12 | 600 | 9.9 |
|  |  |  | 36 | 800 | 9.9 |
| 3 (Invention) | C | Ni/ZnO/SiO2 (Diatomite) | 5 | — | 9.8 |
|  |  |  | 29 | — | 10.0 |
|  |  |  | 34 | — | 9.0 |
|  |  |  | 39 | 384 | 10.6 |
|  |  |  | 45 | 352 | 10.7 |

A comparison of the results set forth in Table 1 clearly shows that replacing the alumina in Sorbent A with silica (Sorbents B and C) in accordance with the present invention dramatically reduces the amount of hydrogen sulfide that is oxidized to sulfur dioxide during the absorption cycle of the inventive process, thereby significantly reducing the amount of sulfur dioxide that passes unabsorbed through the absorbing bed. Additionally, a review of the sulfur loadings set forth in Table 1 demonstrates that the absorbing compositions employed in the process of the present invention are highly effective in the removal of hydrogen sulfide. Finally, a comparison of the results of Run 3 with those of Runs 1 and 2 shows why diatomite is the presently preferred silica for use in the absorbing composition employed in the process of the present invention.

EXAMPLE IV

This example describes the methods that were used to prepare the sorbent materials that are intended to illustrate the different methods that may be used in accordance with the present invention to add nickel oxide to the absorbing compositions of the present invention.

All of the sorbents prepared in this example, except for Sorbent G, comprise $Ni/ZnO/SiO_2/Al_2O_3$ with 6.0 weight-% Ni (as NiO), 47 weight-% ZnO, 38 weight-% $Si_2$, and 9.0 weight-% $Al_2O_3$. The ZnO used to form these sorbents was obtained from St. Joe Minerals Corporation, the silica was Celite Filter-Cel Silica (a diatomite from Johns-Manville Corporation; Denver, CO), and the alumina was Catapal D (Vista Chemical Company; Houston, Tex.).

Sorbent D: Sorbent D was prepared by initially forming a nitric acid solution which contains 80 mL of a nickel nitrate solution, $Ni(NO_3)_2 \cdot 6H_2O$ mixed in water at a concentration of 1.073 g of nickel nitrate hexahydrate/mL solution, and 35 mL of water. This solution was then stirred for 10 minutes. Next, 113 grams of silica, 36 grams of alumina, 142 grams of zinc oxide, and 3 grams of graphite are combined in a sigma mixer, and the resulting mixture is allowed to mix for about 5 minutes. The nickel nitrate solution is then added to the resulting mixture and mixing is continued for about 15 minutes. The resulting paste is then extruded, and the extrudate is dried at 140° C. for about 3 hours. The dried extrudate is then calcined at 635° C. for about 3 hours to form Sorbent D.

Sorbent E: Sorbent E was prepared by initially combining, with stirring, 15 mL of concentrated acetic acid and 112 mL of water to form an acetic acid solution. This solution was then stirred for about 10 minutes. Next, 113 grams of silica, 36 grams of alumina, 142 grams of zinc oxide, 3 grams of graphite, and 22 grams of nickel oxide (Novamet Specialty Products; Wyckoff, N.J.) are combined in a sigma mixer, and the resulting mixture is allowed to mix for about 5 minutes. The acetic acid solution is then added to the resulting mixture, and mixing is continued for about 15 minutes. The resulting paste is then extruded, and the extrudate is dried at 140° C. for about 3 hours. The dried extrudate is then calcined at 635° C. for about 3 hours to form Sorbent E.

Sorbent F: Sorbent F was prepared by initially combining, with stirring, 0.316 lbs of alumina, 0.072 lbs of concentrated acetic acid, and 1.083 lbs of distilled, water to form an alumina sol. 1.0 1 lb of silica was then added to the alumina sol and the resulting mixture was mixed for about 10 minutes. 1.25 lbs of zinc oxide was then added to the resulting mixture and mixing was continued for about 10 minutes to form an extrudable paste. The resulting extrudable paste was allowed to age for about 30 minutes and was then extruded to form an extrudate. The extrudate was then dried at 140° C. for about 3 hours, and was subsequently calcined at 635° C. for about 45 minutes. The calcined extrudate was then spray impregnated with about 260 grams of a nickel nitrate solution (0.87 grams $Ni(NO_3)_2 \cdot 6H_2$/ mL solution) and 12.7 grams of distilled water. The impregnated extrudate was then dried overnight at about at 140° C. The dried extrudate is then calcined at 635° C. for about 45 minutes to form Sorbent F.

Sorbent G: Sorbent G comprises 6.0 weight-% Ni (as NiO), 47 weight-% ZnO, and 47 weight-% alumina.

Sorbent G was prepared by initially combining 22.1 lbs of ZnO and 27.9 lbs of alumina. This mixture was mixed for about 5 minutes. About 20.4 lbs of a 13.45 wt-% nitric acid solution was then added to the mixture, and mixing was continued for about 5 minutes to form an extrudable paste. The extrudable paste was allowed to age for about 30 minutes, and was then extruded to form an extrudate. The extrudate was dried at 135° C. for about 3 hours, and was then calcined for about 45 minutes at 635° C. The calcined extrudate was then impregnated with a nickel nitrate solution, and the impregnated extrudate was again dried and calcined, in the manner discussed above, to form Sorbent G.

EXAMPLE V

This example illustrates the use of the sorbents described in Example IV within the procedure described in Example I for the removal of $H_2S$ from a simulated sulfur plant gas. The results are presented as a function of the amount of sulfur dioxide (measured in ppm) present in the effluent gaseous stream at a point in time 10 minutes into the absorption cycle, and of the total amount of sulfur absorbed by the sorbent (measured on a weight basis) at the time of hydrogen sulfide breakthrough. The test results are summarized in Table II.

TABLE II

| Run | Sorbent | Cycle # | SO2 Level | Sulfur Loading |
|---|---|---|---|---|
| 1 (Invention) | D | 1 | — | 12.3 |
| | | 2 | 548 | 13.4 |
| | | 14 | 545 | 10.8 |
| | | 19 | 525 | 13.4 |
| | | 23 | 541 | 14.0 |
| | | 24 | 514 | 13.7 |
| | | 27 | 563 | 13.8 |
| | | 32 | 528 | 13.5 |
| | | 35 | 528 | 14.1 |
| | | 50 | 510 | 13.3 |
| 2 (Invention) | E | 2 | — | 12.1 |
| | | 6 | 553 | 13.4 |
| | | 10 | 470 | 12.7 |
| | | 23 | 487 | 13.0 |
| | | 27 | 600 | 14.0 |
| | | 40 | 600 | 13.8 |
| 3 (Invention) | F | 1 | — | 13.3 |
| | | 2 | 600 | 12.8 |
| | | 6 | 600 | 12.4 |
| | | 8 | 600 | 11.5 |
| | | 11 | 600 | 12.2 |
| | | 33 | 380 | 10.4 |
| | | 39 | 371 | 10.7 |
| | | 44 | 340 | 10.2 |
| | | 50 | 346 | 10.2 |
| 4 (Control) | G | 13 | 1500 | 6.1 |
| | | 17 | 1000 | 7.3 |
| | | 29 | 1100 | 7.4 |
| | | 35 | 1200 | 7.5 |
| | | 42 | 1100 | 7.9 |
| | | 54 | 900 | 6.9 |

The data contained in Table II demonstrates that the nickel promoter employed in one embodiment of the present invention can be included as an original component in the preparation of the absorbing composition (Sorbents A and B) or that it may be added as a promoter to an existing absorbing composition (Sorbent C). Additionally, the data demonstrates that the nickel promoter may be added in the form of nickel oxide (Sorbent B), or in the form of a nickel compound that is convertible to nickel oxide (Sorbent A). Regardless of how the nickel promoter is added to the absorbing composition, it is evident from the above data that the resulting composition is an effective absorbing composition for hydrogen sulfide, that does not readily oxidize hydrogen sulfide to sulfur dioxide during the absorption cycle of the process of the present invention. Finally, a comparison of Run 4 with Runs 1-3 clearly illustrates the superiority, in terms of both an ability to absorb sulfur and avoid oxidizing hydrogen sulfide to sulfur dioxide, of the inventive absorbing compositions over an absorbing composition containing alumina.

While this invention has been described in detail for purposes of illustration, it is not to be construed as limited thereby but is intended to include all reasonable variations and modifications within the scope and spirit of the described invention and the appended claims.

That which is claimed is:

1. An absorbing composition comprising zinc oxide and silica in the substantial absence of alumina.

2. A composition in accordance with claim 1 wherein said zinc oxide is present in said composition in an amount in the range of about 10 weight-% to about 90 weight-%, said weight-% being expressed in terms of the zinc oxide based upon the total weight of the composition.

3. A composition in accordance with claim 2 wherein said zinc oxide is present in said composition in an amount in the range of about 45 weight-% to about 90 weight-%.

4. A composition in accordance with claim 2 wherein said zinc oxide present in said composition in an amount in the range of about 45 weight-% to about 60 weight-%.

5. A method for preparing an absorbing composition comprising zinc oxide and silica in the substantial absence of alumina comprising the steps of:
   a.) mixing zinc oxide or a precursor of zinc oxide with silica or a precursor of silica to form a homogeneous mixture thereof;
   b.) adding a dilute acid to said homogeneous mixture to form an extrudable paste;
   c.) extruding said extrudable paste to form an extrudate;
   d.) drying said extrudate; and
   e.) calcining the dried extrudate to produce said composition.

6. A method in accordance with claim 5 wherein said precursor of zinc oxide is selected from the group consisting of zinc sulfide, zinc sulfate, zinc hydroxide, zinc carbonate, zinc acetate, and zinc nitrate; said precursor of silica is selected from the group consisting of silicic acid, sodium silicate, and ammonium silicate; said dilute acid is a dilute solution of an acid selected from the group consisting of nitric acid, acetic acid, sulfuric acid, and hydrochloric acid; the concentration of said acid in said dilute acid is in the range of about 1.0 weight-% to about 15 weight-% based upon the total weight of the dilute acid; the amount of dilute acid added to said homogeneous mixture results in an amount of water being added to said homogeneous mixture in the range of about 0.26 lbs water/lbs solids to about 0.38 lbs water/lbs solids; said extrudate is dried at a temperature in the range of about 75° C. to about 300° C. for a period of time in the range of about 0.5 hour to about 4 hours; and, said dried extrudate is calcined in the presence of oxygen at a temperature in the range of about 375° C. to about 750° C. for a period of time in the range of about 0.5 hour to about 4 hours to produce said composition.

7. A composition in accordance with claim 4 wherein said composition is prepared by the process comprising the steps of:
   a.) mixing powdered zinc oxide with silica to form a homogeneous mixture thereof;
   b.) adding dilute acetic acid, having an acid concentration in the range of about 1.0 weight-% to about 5.0 weight-% based upon the total weight of the dilute acid, to said homogeneous mixture to form an extrudable paste;
   c.) extruding said extrudable paste to form an extrudate;
   d.) drying said extrudate at a temperature in the range of about 90° C. to about 250° C. for a period of time in the range of about 1 hour to about 3 hours; and,
   e.) calcining the dried extrudate in the presence of oxygen at a temperature in the range of about 500° C. to about 700° C. for a period of time in the range of about 1 hour to about 3 hours to produce said composition.

8. A composition in accordance with claim 7 wherein the amount of dilute acetic acid added to said homogeneous mixture results in an amount of water being added to said homogeneous mixture in the range of about 0.26 lbs water/lbs solids to about 0.30 lbs water/lbs solids.

* * * * *